US011124364B1

(12) United States Patent
Chitragar et al.

(10) Patent No.: US 11,124,364 B1
(45) Date of Patent: Sep. 21, 2021

(54) ENERGY HARVESTING BRAKE SYSTEM

(71) Applicant: Goodrich Corporation, Charlotte, NC (US)

(72) Inventors: Venkatesh Chitragar, Bangalore (IN); Vinodkumar Shivalinga, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/943,509

(22) Filed: Jul. 30, 2020

(30) Foreign Application Priority Data

Mar. 13, 2020 (IN) .............................. 202041010914

(51) Int. Cl.
  *B65G 13/075* (2006.01)
  *B64D 9/00* (2006.01)
(52) U.S. Cl.
  CPC ............ *B65G 13/075* (2013.01); *B64D 9/00* (2013.01); *B64D 2009/006* (2013.01)
(58) Field of Classification Search
  CPC ...... B65G 13/075; B65G 13/071; B64D 9/00; B64D 2009/006
  USPC ................ 193/35 A, 37; 198/345.3
  See application file for complete search history.

(56) References Cited

U.S. PATENT DOCUMENTS

| 5,677,488 | A | * | 10/1997 | Monahan | ................ | F16C 19/30 340/682 |
| 6,131,717 | A | | 10/2000 | Owen | | |
| 6,336,542 | B1 | | 1/2002 | Mintonye, II | | |
| 6,834,757 | B2 | | 12/2004 | Holzner et al. | | |
| 7,469,593 | B2 | | 12/2008 | Zumberge et al. | | |
| 8,109,702 | B2 | | 2/2012 | Stegmiller et al. | | |
| 9,694,978 | B2 | | 7/2017 | Harms et al. | | |
| 9,889,990 | B2 | | 2/2018 | Dimitrov et al. | | |
| 10,377,288 | B2 | | 8/2019 | Davis | | |
| 2006/0107765 | A1 | * | 5/2006 | Sentoku | ................ | F16C 19/522 73/862.322 |
| 2014/0360844 | A1 | * | 12/2014 | Wilkins | ................ | B65G 13/07 198/790 |
| 2017/0038627 | A1 | * | 2/2017 | Jing | .................. | G02F 1/133784 |

FOREIGN PATENT DOCUMENTS

CN 106515807 3/2017

* cited by examiner

*Primary Examiner* — James R Bidwell
(74) *Attorney, Agent, or Firm* — Snell & Wilmer L.L.P.

(57) ABSTRACT

An energy harvesting brake system may comprise a shaft, a roller cylinder, and a piezoelectric material. The roller cylinder may be configured to rotate relative to the shaft in response to a target moving relative to a platform. The piezoelectric material may be in operable communication with the shaft and the roller cylinder such that relative rotational motion between the shaft and the roller cylinder causes cyclic stress in the piezoelectric material thereby generating electrical energy.

20 Claims, 11 Drawing Sheets

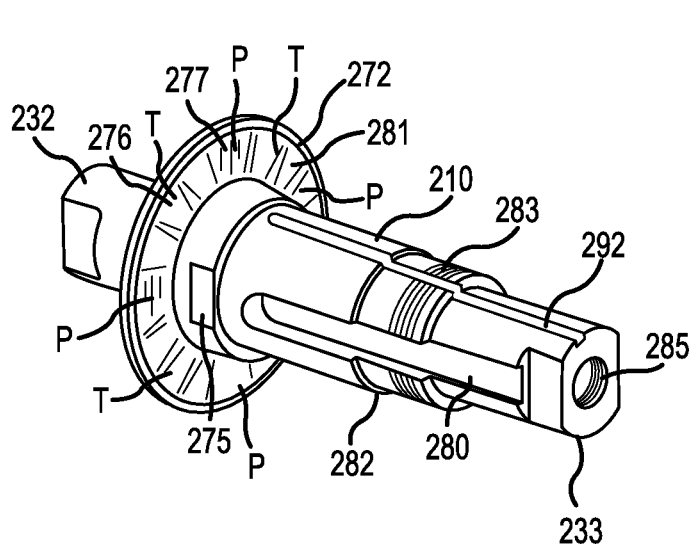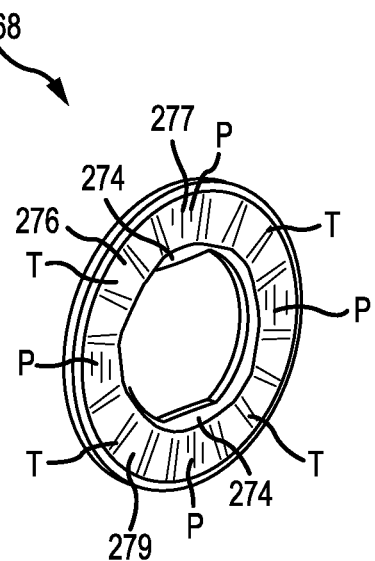
FIG.3C  FIG.3D
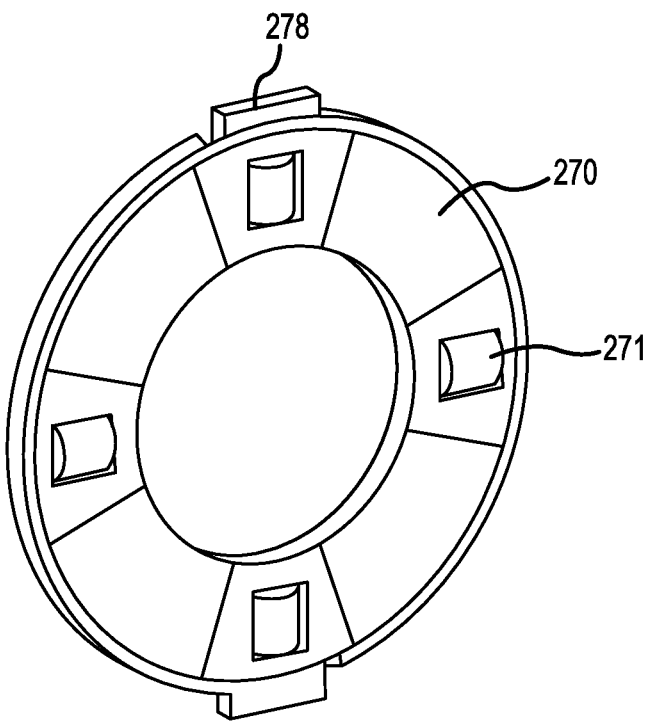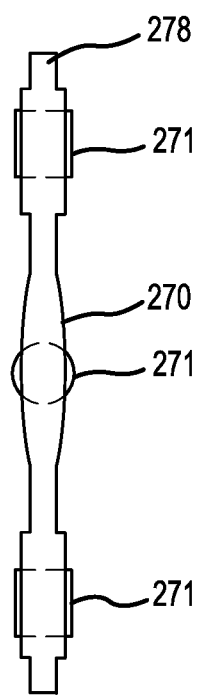
FIG.3E  FIG.3F

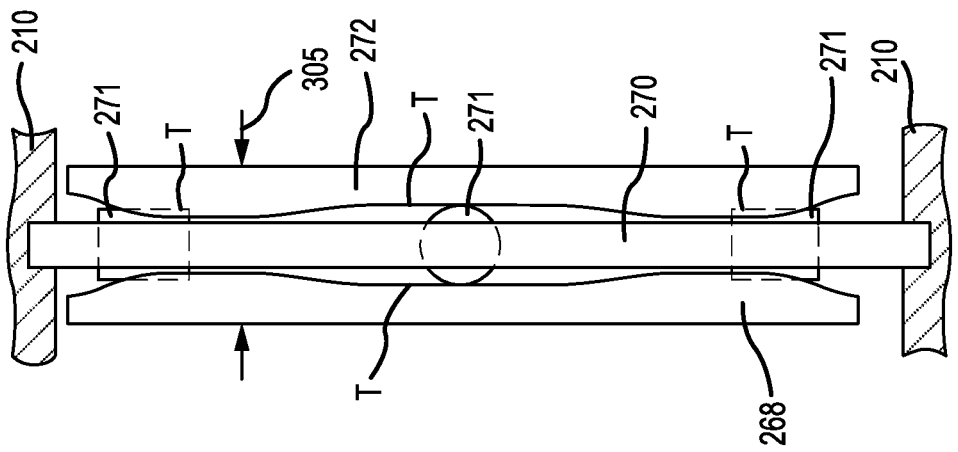
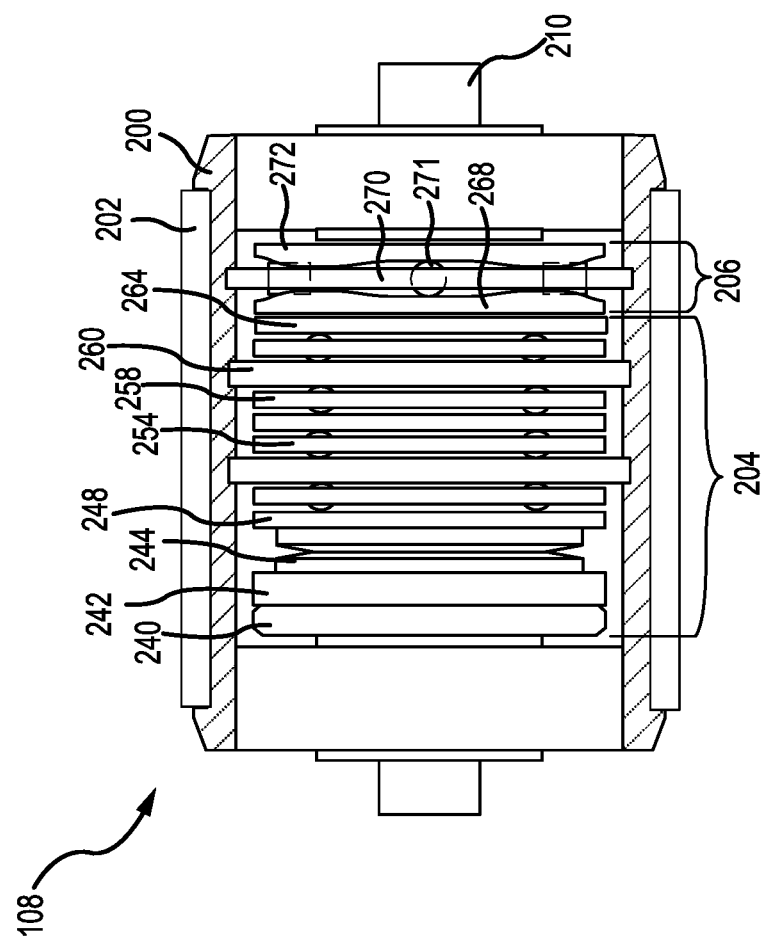
FIG.4B
FIG.4A

ENERGY HARVESTING BRAKE SYSTEM

CROSS REFERENCE TO RELATED APPLICATIONS

This application claims priority to and the benefit of India Patent Application No. 202041010914 filed on Mar. 13, 2020 and entitled "ENERGY HARVESTING BRAKE SYSTEM," which is hereby incorporated by reference in its entirety.

FIELD

The present disclosure relates generally to cargo handling systems and, more particularly, energy harvesting brake systems for cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include roller trays containing transport rollers that support and transport the containerized cargo or pallets. Motor driven rollers are typically employed in these systems. In certain aircraft, a plurality of motor driven power drive units (PDUs) is used to propel the containers or pallets within the cargo compartment. This configuration facilitates transportation of the containers or pallets within the cargo compartment by one or more operators or agent-based systems controlling operation of the PDUs.

Unwanted movement of ULDs during loading and unloading may present a safety risk to operators or related loading personnel or result in damage to an aircraft cargo compartment. Braking mechanisms are thus installed within the cargo handling system to help protect loading personnel and the aircraft from possible damage during loading and unloading due to unwanted movement. A typical braking mechanism includes a braking caster, which may have a rotating element that protrudes above a conveyor plane (e.g., the plane upon which the ULDs traverse the cargo deck) and is typically installed near the cargo door. The rotating element of the braking caster is configured to decelerate or stop a ULD, but allow travel when the ULD is manually or power driven over the cargo deck.

The rotating element typically has a preset braking load selected for a maximum weight of a loaded ULD at a maximum angle of the cargo deck or the conveyor plane. Because of the maximum settings, the braking load may be too powerful to allow the rotating element to roll under light loads. The rotating element often includes a friction material that surrounds the outer surface of a cylindrical roller. In instances where the load applied to the rotating element is not sufficient to overcome the braking load, the ULD may skid over the roller, wear away the friction material and create a flat spot on the roller.

The power demands of cargo handling systems and aircrafts in general are increasing due to, for example, the use of smart electric systems and an increased number of active sensors, which draw power throughout a flight cycle. Conventional power generation may add more weight to the system which may reduce the systems performance and efficiency.

SUMMARY

An energy harvesting brake system is disclosed herein. In accordance with various embodiments, the energy harvesting brake system may comprise a shaft, a roller cylinder, and a piezoelectric material. The roller cylinder may be configured to rotate relative to the shaft in response to a target moving relative to a platform. The energy harvesting brake system being disposed in the platform. The piezoelectric material may be in operable communication with the shaft and the roller cylinder such that relative rotational motion between the shaft and the roller cylinder causes cyclic stress in the piezoelectric material thereby generating electrical energy.

In various embodiments, the energy harvesting brake system may further comprise a guide plate and a slider disk. The guide plate may be configured to rotate about the shaft and may include a roller. The slider disk may have a first axial facing surface defining a slider disk trough and a slider disk peak. The slider disk may be configured to translate axially on the shaft in response to the roller interacting with the slider disk trough and the slider disk peak. The piezoelectric material may be configured to deform in response to translation of the slider disk on the shaft.

In various embodiments, the guide plate may comprise a radially outward extending protrusion configured to engage the roller cylinder. The slider disk may be rotationally stationary with respect to the shaft.

In various embodiments, a brake stack may be located around the shaft. The brake stack may include a stator plate, a rotor plate, and a roller and roller cage element located axially between the stator plate and the rotor plate. In various embodiments, the stator plate may comprise the piezoelectric material.

In various embodiments, a flange may extend radially outward from the shaft. The flange may have a second axial facing surface oriented toward the first axial facing surface. The second axial facing surface may define a flange trough and a flange peak.

In various embodiments, a wire may be electrically coupled to the piezoelectric material. In various embodiments, the wire may be located in a channel defined by the shaft.

In various embodiments, a brake stack may be located around the shaft. The brake stack may comprise a first stator plate and a first rotor plate. The first stator plate may include a first radially inward extending protrusion located in a first slot defined by the shaft. The first rotor plate may include a first radially outward extending protrusion located in a second slot defined by the roller cylinder. The brake stack may further comprise a second stator plate and a second rotor plate. The second stator plate may include a second radially inward extending protrusion located in the first slot defined by the shaft. The second rotor plate may include a second radially outward extending protrusion located in the second slot defined by the roller cylinder. A first roller and roller cage element may be located axially between the first stator plate and the first rotor plate. A second roller and roller cage element may be located axially between the second stator plate and the second rotor plate.

In various embodiments, the first stator plate may comprise the piezoelectric material, and the second stator plate may comprise a second piezoelectric material.

In various embodiments, a wire may be electrically coupled to the piezoelectric material and the second piezoelectric material. The wire may be located in a channel defined by the shaft.

A method of harvesting electrical energy while braking is also disclosed herein. In accordance with various embodiments, the method may comprise moving a target relative to a platform having an energy harvesting brake system disposed therein, rotating a roller cylinder of the energy harvesting brake system with the movement of the target, cyclically stressing a piezoelectric material disposed in the energy harvesting brake system with the rotation of the roller cylinder, and generating electrical energy with the cyclical stressing.

In various embodiments, the method may further comprise braking movement of the target relative to the platform. In various embodiments, the energy harvesting brake system may comprise a shaft, the roller cylinder, the piezoelectric material, a guide plate configured to rotate about the shaft, and a slider disk configured to translate axially on the shaft in response to rotation of the guide plate about the shaft. The piezoelectric material may be configured to deform in response to axial translation of the slider disk.

An energy harvesting system is also disclosed herein. In accordance with various embodiments, the energy harvesting system may comprise a first energy storage device and an energy harvesting brake system electrically coupled to the first energy storage device. The energy harvesting brake system may include a shaft, a roller cylinder, and a piezoelectric material. The roller cylinder may be configured to rotate relative to the shaft. The piezoelectric material may be in operable communication with the shaft and the roller cylinder such that relative rotational motion between the shaft and the roller cylinder causes cyclic stress in the piezoelectric material thereby generating electrical energy.

In various embodiments, the energy harvesting brake system may further comprise a guide plate configured to rotate about the shaft and a slider disk configured to translate axially on the shaft in response to rotation of the guide plate about the shaft. the piezoelectric material may be configured to deform in response to axial translation of the slider disk.

In various embodiments, a voltage amplification circuit may be electrically coupled between the piezoelectric material and the first energy storage device.

In various embodiments, a cargo handling component may be configured to receive electrical energy from the first energy storage device. In various embodiments, the cargo handling component may comprise at least one of a sensor, a light, or a second energy storage device.

In various embodiments, the energy harvesting brake system may further comprise a flange extending radially outward from the shaft. The flange may have an axial facing surface defining a flange trough and a flange peak.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 3C illustrates a perspective view of a shaft of a brake assembly for an energy harvesting brake system, in accordance with various embodiments;

FIG. 3D illustrates a perspective view of a slider disk of a brake assembly for an energy harvesting brake system, in accordance with various embodiments;

FIGS. 3E and 3F illustrates a perspective view and a side view, respectively, of a guide plate with rollers of a brake assembly for an energy harvesting brake system, in accordance with various embodiments;

FIGS. 4A and 4B illustrate an energy harvesting brake system in a state of minimum brake force, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
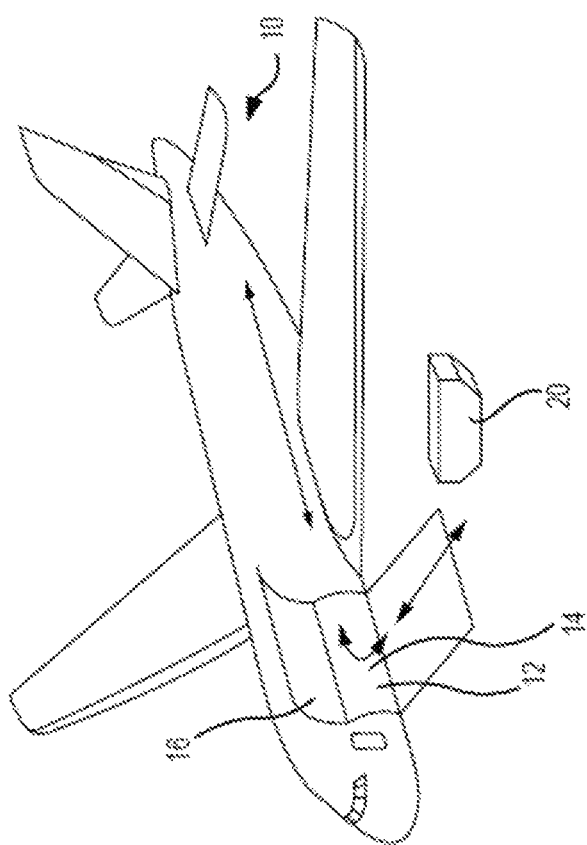
FIG. 1A illustrates an aircraft being loaded with cargo, in accordance with various embodiments.

With reference to FIG. 1A, an aircraft 10 is illustrated. In accordance with various embodiments, aircraft 10 includes a cargo deck 12 located within a cargo compartment 14 of aircraft 10. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, generally in reverse sequence to the loading procedure. To facilitate movement of the ULD 20 along the cargo deck 12, the aircraft 10 may include a cargo handling system as described herein.

Figure 1B:
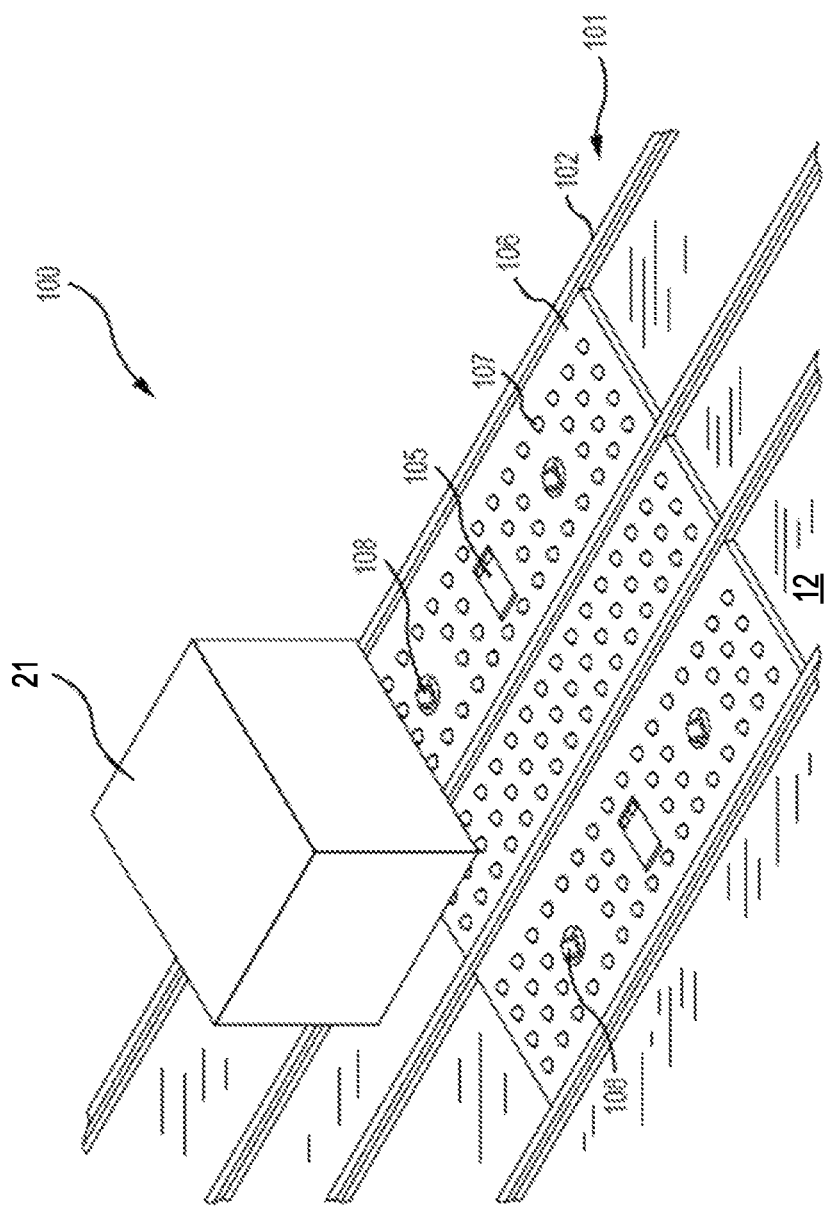
FIG. 1B illustrates a portion of a cargo handling system, in accordance with various embodiments.

Referring now to FIG. 1B, a portion of a cargo handling system 100 is illustrated, in accordance with various embodiments. In various embodiments, the cargo handling system 100 may define a platform 101 having a plurality of trays 102 supported by the cargo deck 12. The plurality of trays 102 may be configured to support a target 21 In various embodiments, target 21 is a ULD (e.g., a container or a pallet) configured to hold cargo as described above with reference to ULD 20 in FIG. 1A. In various embodiments, trays 102 are disposed throughout the cargo deck 12 and may include rollers configured to facilitate conveyance of target 21 over cargo deck 12. Cargo handling system 100 may further include one or more power drive units 105 and one or more of ball panel(s) 106. Ball panel(s) 106 each have a plurality of ball transfer units 107 located therein.

Cargo handling system 100 further includes one or more energy harvesting brake system(s) 108. Energy harvesting brake systems 108 are disposed in the platform 101. In various embodiments, the energy harvesting brake systems 108 may be located proximate a cargo load door, such as, for example, the cargo load door 16 described above with reference to FIG. 1A, but may otherwise be located throughout the cargo handling system 100 and the cargo deck 12. In various embodiments, one or more energy harvesting brake systems 108 are disposed in ball panels 106.

Figure 2A:
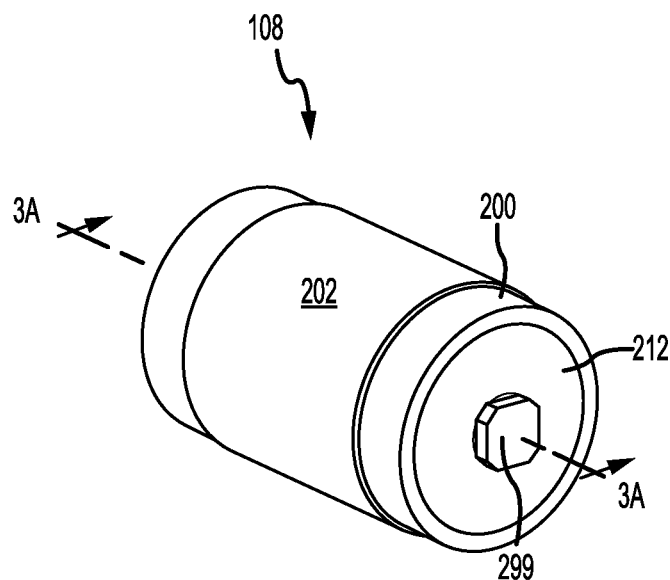
FIGS. 2A and 2B illustrate an assembled view and an exploded view, respectively, of an energy harvesting brake system, in accordance with various embodiments.
Figure 2B:
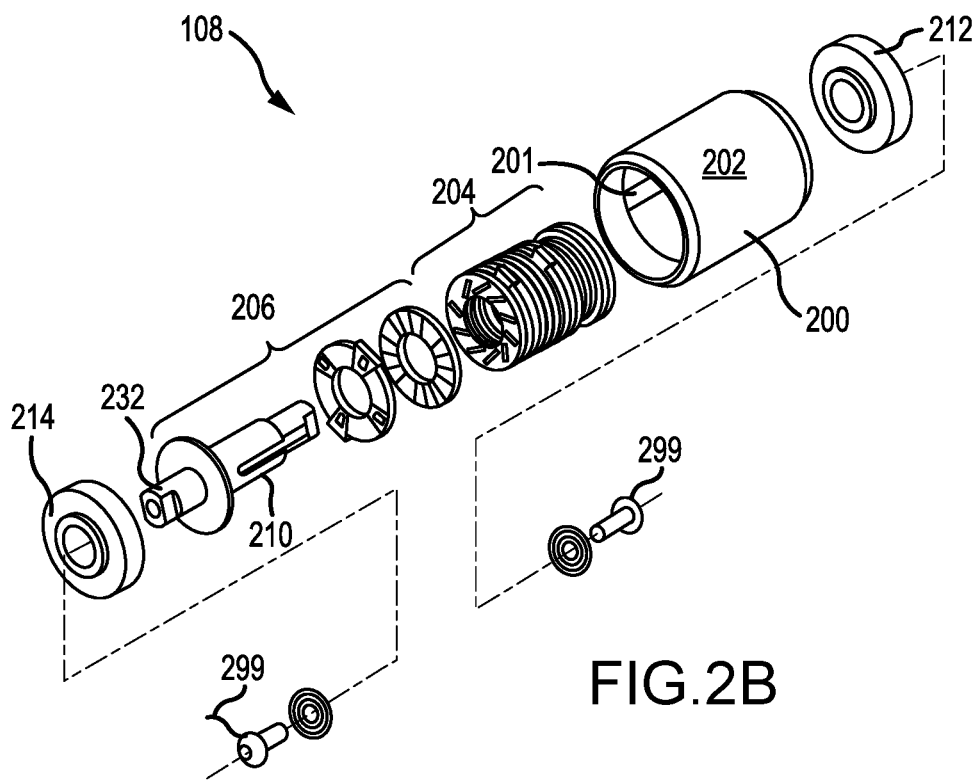

Referring now to FIGS. 2A and 2B, an energy harvesting brake system 108 is illustrated. In accordance with various embodiments, energy harvesting brake system 108 may include a roller cylinder 200 and a tire 202. Tire 202 may be located around roller cylinder 200. Tire 202 is configured to provide a frictional surface to engage a bottom surface of a target, such as target 21 in FIG. 1B.

Energy harvesting brake system 108 further includes a brake stack 204, a slider disk subassembly 206, and a shaft 210. Brake stack 204, slider disk subassembly 206, and shaft 210 are located radially inward of roller cylinder 200. Roller cylinder 200 is configured to rotate relative to the shaft 210 in response to target 21, with momentary reference to FIG. 1A, moving relative to platform 101. In various embodiments, energy harvesting brake system 108 may further include a first roller bearing 212 and a second roller bearing 214. First and second roller bearings 212, 214 may be located radially between roller cylinder 200 and shaft 210. First and second roller bearings 212, 214 may be configured to facilitate the rotation of roller cylinder 200 about shaft 210.

Figure 3A:
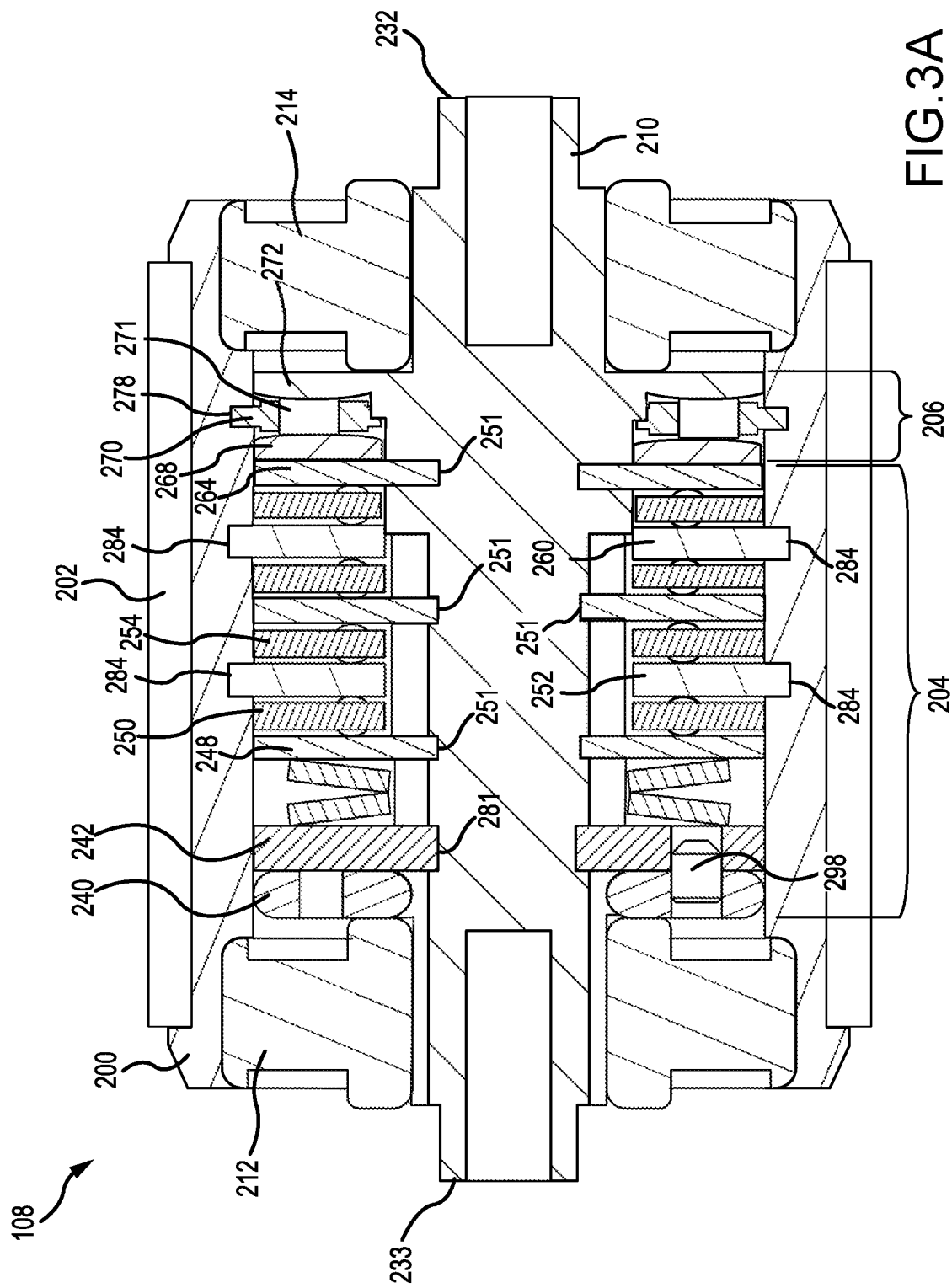
FIG. 3A illustrates a cross sectional view of an energy harvesting brake system taken along the line 3A-3A in FIG. 2A, in accordance with various embodiments.
Figure 3B:
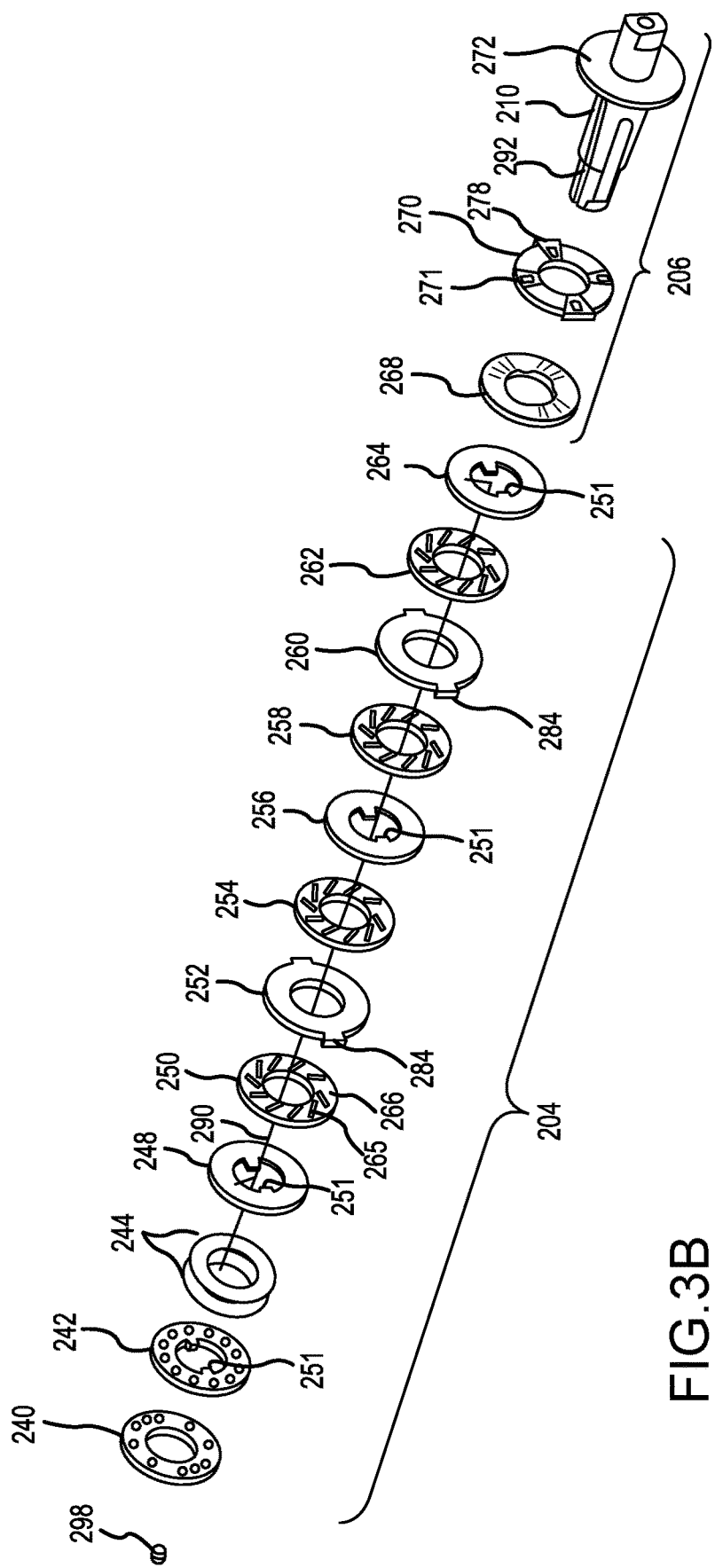
FIG. 3B illustrates an exploded view of a brake assembly of an energy harvesting brake system, in accordance with various embodiments.

Referring now to FIGS. 3A, 3B, 3C, 3D, 3E and 3F, various illustrations are provided to further describe the components and other aspects of energy harvesting brake system 108. Referring primarily to FIGS. 3A and 3B, the brake stack 204 includes a nut 240, a nut retainer 242, and a biasing element 244, such as, for example, a coil spring, a Belleville washer, or the like. Nut 240, nut retainer 242, and biasing element 244 are located proximate first roller bearing 212. In this regard, nut 240, nut retainer 242, and biasing element 244 are located axially opposite slider disk subassembly 206. The brake stack 204 further includes non-rotating stator plates interleaved with rotating rotor plates and roller and roller cage elements located axially between each stator plate and rotor plate. For example, in various embodiments, brake stack 204 may include a distal (or first) stator plate 248 configured to engage the shaft 210, a first roller and roller cage element 250, a first rotor plate 252 configured to engage the roller cylinder 200, a second roller and roller cage element 254, an internal (or second) stator plate 256 configured to engage the shaft 210, a third roller and roller cage element 258, a second rotor plate 260, a fourth roller and roller cage element 262, and a proximal (or third) stator plate 264 configured to engage the shaft 210. A lock screw 298 may be used to secure the nut 240 to the nut retainer 242. Distal stator plate 248 may be located axially opposite proximal stator plate 264 and slider disk subassembly 206.

The stator plates act similar to stator disks and the rotor plates act similar to rotor disks in a friction-based brake stack. In this regard, the stator plates comprise generally non-rotating components due their engagement with shaft 210 and the rotor plates comprise generally rotating components due to their engagement with roller cylinder 200. For example, each of the stator plates 248, 256, 264, and the nut retainer 242 may include one or more radially inward extending protrusion(s) 251 configured to engage shaft 210, and each of the rotor plates 252, 260 may include one or more radially outward extending protrusions 284 configured to engage roller cylinder 200. Protrusions 251 extend radially inward from an inner circumferential surface of the stator plate. Protrusions 284 extend radially outward from an outer circumferential surface of the rotor plate.

In various embodiments, the roller and roller cage elements are each disposed between opposing faces of the stator plates and the rotor plates to reduce or avoid surface contact between the opposing faces and the wear and heat that would be otherwise generated. As illustrated, each the roller and roller cage element includes rollers 265 rotationally coupled to a roller cage 266. The axis of rotation of each roller 265 within each roller cage 266 is inclined at an angle with respect to a radial direction (e.g., a direction perpendicular to an axis of rotation of roller cylinder 200). In this regard, the axis of rotation of roller 265 may be non-perpendicular to the axis of the rotation of roller cylinder 200. Inclination angle of the rollers 265 tends to provide a more effective braking action when an axial load is applied to the stator and rotor plates, against an axial counter load applied by the biasing element 244.

In accordance with various embodiments, distal stator plate 248 and/or proximal stator plate 264 are formed of a piezoelectric material such as lead zirconate titanate, barium titanate, lithium niobate, quartz, or any other suitable piezoelectric material. In this regard, distal stator plate 248 and proximal stator plate 264 comprise piezoelectric members of energy harvesting brake system 108. In various embodiments, distal stator plate 248 and proximal stator plate 264 each comprise a piezoelectric bimorph having a passive layer between two active layers of piezoelectric material. While distal stator plate 248 and proximal stator plate 264 are described herein as piezoelectric members, it is contemplated and understood that brake stack 204 may include any number (i.e., more than two or fewer than two) of piezoelectric members, and that any stator plate of brake stack 204 may be a piezoelectric member. For example, in various embodiments, internal stator plate 256 comprise a piezoelectric material.

One or more wire(s) 290 is/are in direct contact with the piezoelectric material of energy harvesting brake system 108 (i.e., with distal stator plate 248 and proximal stator plate 264 of brake stack 204). In this regard, wire 290 is electrically coupled to distal stator plate 248 and to proximal stator plate 264. In various embodiments, wire 290 may be routed through shaft 210. Stated differently, wire 290 may be located in a channel 292 defined by shaft 210.

In accordance with various embodiments, the slider disk subassembly 206 includes a slider disk 268, a guide plate 270 having a plurality of rollers 271, and a flange 272 projecting radially outward from the shaft 210. Guide plate 270 is located axially between flange 272 and slider disk 268. The slider disk 268 is configured to remain rotationally stationary with respect to the shaft 210. For example, in various embodiments, and with particular reference to FIGS. 3C and 3D, an inner circumferential (or radially inner) surface of the slider disk 268 includes flat portions 274 that are configured to engage flat portions 275 on an outer circumferential (or radially outer) surface of the shaft 210. The flat portions 274 and the flat portions 275 tend to prevent the slider disk 268 from rotating with respect to the shaft 210, but permit axial (or sliding) movement of the slider disk 268 with respect to the shaft 210 and to the flange 272.

In accordance with various embodiments, one or both of the slider disk 268 and the flange 272 include peaks 276 (e.g., slider disk peaks or flange peaks, or a plurality of such peaks) and troughs 277 (e.g., slider disk troughs or flange troughs, or a plurality of such troughs). For example, as illustrated in FIGS. 3C and 3D, the slider disk 268 includes a plurality of peaks (P) interspersed with a plurality of troughs (T) about the face (or a axial facing surface) 279 on the slider disk 268. In various embodiments, the plurality of peaks (P) is spaced at ninety degree (90°) intervals (e.g., at locations equal to 0°, 90°, 180° and 270°). Offset by forty-five degrees (45°) with respect to the peaks (P), the plurality of troughs (T) is also spaced at ninety degree (90°) intervals (e.g., at locations equal to 45°, 135°, 225° and 315°). In various embodiments, the surface of face 279 having the plurality of peaks (P) and the plurality of troughs (T) just described may define or be characterized by a first periodic function (e.g., a sine wave) extending around the face 279 of the slider disk 268, with each peak and trough representing, for example, a radians of the periodic function. The flange 272, as illustrated, similarly includes a plurality of peaks (P) and troughs (T) spaced at ninety degree (90°) intervals and offset by forty-five degrees (45°) about the face (or axial facing surface) 281 of the flange 272. Similar to the discussion above, the plurality of peaks and the plurality of troughs of the face 281 of the flange 272 may define or be characterized by a second periodic function extending around the face 281 of the flange 272. Face 279 of slider disk 268 is oriented toward face 281 of flange 272. Typically, the plurality of peaks (P) and the plurality of troughs (T) on both the slider disk 268 and the flange 272 are in phase with each other and both the first periodic function and the second periodic function are substantially identical or identical. Further, while the illustrated embodiments include four peaks and four troughs interspersed among the peaks, the disclosure contemplates any number of peaks and troughs, generally an even number or both, and not necessarily arranged in the shape of a pure sine wave function. In other words, the functional shape of the peaks and troughs may comprise any functional relationship (including functional relationships defined, at least in part, by straight lines), so long as a plurality of peaks is interspersed with a plurality of troughs on the face of at least one of the slider disk 268 and the flange 272.

Referring now to FIGS. 3E and 3F, guide plate 270 including rollers 271 is illustrated. In various embodiments, and consistent with the description of the slider disk 268 and the flange 272 above, the plurality of rollers 271 includes four rollers 271 spaced at ninety degree (90°) intervals about the guide plate 270. As illustrated in FIGS. 3A and 3B, rollers 271 are disposed at a radial location on the guide plate 270 and configured to roll over the peaks and the troughs of the flange 272 and the slider disk 268 as the guide plate 270 rotates with respect to both the flange 272 and the slider disk 268. As further illustrated in FIGS. 3A, 3E and 3F, the guide plate 270 includes one or more radially outward extending protrusions 278 configured to engage with the roller cylinder 200. As a result, when the roller cylinder 200 is driven (e.g., by a ULD) to rotate about the shaft 210, the guide plate 270 will rotate relative to the slider disk 268 and the flange 272, both of which are held rotationally stationary with respect to the shaft 210. As the guide plate 270 so rotates, the plurality of rollers 271 disposed thereon will roll up and down the peaks and troughs, respectively, thereby urging the slider disk 268 to move back and forth (i.e., toward and away) in an axial direction with respect to the flange 272 of shaft 210.

Referring again to FIG. 3C and FIG. 3B, the shaft 210 further includes an elongated slot 280 (or a plurality of elongated slots) for receiving radially inward extending protrusions 251 of the stator plates 248, 256, 264 and nut retainer 242. Stated differently, radially inward extending protrusions 251 of the stator plates 248, 256, 264 may be located in elongated slot(s) 280 defined by shaft 210. In various embodiments, the shaft 210 also includes a step face 282 to stop the nut retainer 242 from sliding axially beyond the step face 282 toward the flange 272. The shaft 210 may further include an external threaded section 283 for engaging a threaded surface of the nut 240. An end 232 and/or an 233 of shaft 210 may comprise flat sides that correspond with a mounting structure (e.g., a pair of lungs) configured to receive shaft 210. The flat sides of ends 232, 233 are configured to generate an interference with the mounting structure, thereby preventing or reducing rotation of shaft 210 relative to the mounting structure. One or both of the ends 232, 233 of shaft 210 may define an internal threaded section 285 for receiving a mounting pin or bolt, such as, for example, threaded pins 299 in FIG. 2B. In various embodiments, and with reference to FIGS. 2B and 3B, the roller cylinder 200 includes one or more elongated slots 201 configured to receive radially outward extending protrusions 284 extending from rotor plates 252, 260 and radially outward extending protrusions 278 of the guide plate 270.

Stated differently, radially outward extending protrusions 284 of rotor plates 252, 260 and radially outward extending protrusions 278 of the guide plate 270 may be located in slot 201 defined by a radially inward surface of roller cylinder 200.

Figure 4D:
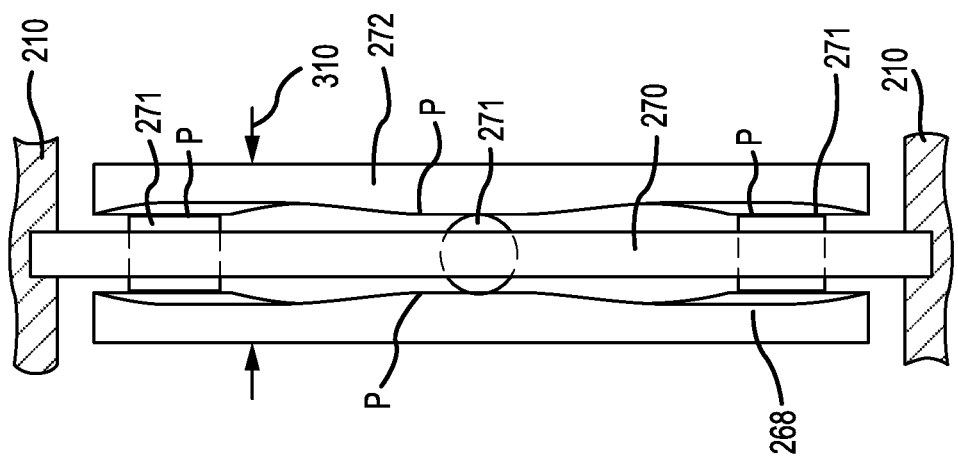
FIGS. 4C and 4D illustrate an energy harvesting brake system in a state of maximum brake force, in accordance with various embodiments.

Referring now to FIGS. 4A, 4B, 4C and 4D, operation of an energy harvesting brake system 108, is illustrated and described, in accordance with various embodiments. Referring to FIG. 4A and FIG. 4B (which is a close up view of the slider disk subassembly 206 shown in FIG. 4A), the energy harvesting brake system 108 assumes a state of minimum, or near minimum, brake force, where the rollers 271 mounted on guide plate 270 reside in respective troughs in flange 272 and slider disk 268. In the state of minimum brake force, the slider disk subassembly 206 assumes a minimum thickness 305. While in the state of minimum thickness, biasing element 244 of the brake stack 204 remains substantially uncompressed (or in a state of minimum compression consistent with a default pre-torque or brake force), resulting in the application of a minimum brake force against rotation of the roller cylinder 200 about the shaft 210.

Figure 4C:
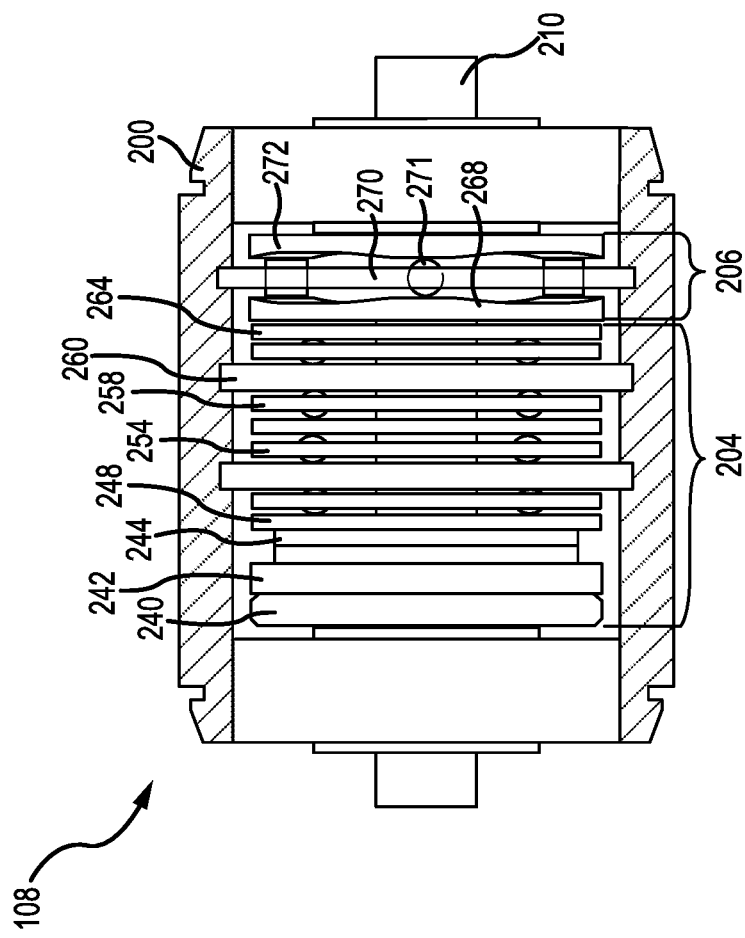

Referring to FIG. 4C and FIG. 4D (which is a close up view of the slider disk subassembly 206 shown in FIG. 4C), the energy harvesting brake system 108 assumes a state of maximum, or near maximum, brake force, where the rollers 271 mounted on the guide plate 270 reside on respective peaks on flange 272 and the slider disk 268, in a fashion similar to that described above. In the state of maximum brake force, the slider disk subassembly 206 assumes a maximum thickness 310, which is greater than the minimum thickness 305. While in the state of maximum thickness, the biasing element 244 of the brake stack 204 becomes substantially compressed (or in a state of maximum compression), resulting in the application of a maximum brake force against rotation of the roller cylinder 200 about the shaft 210.

Figure 5:
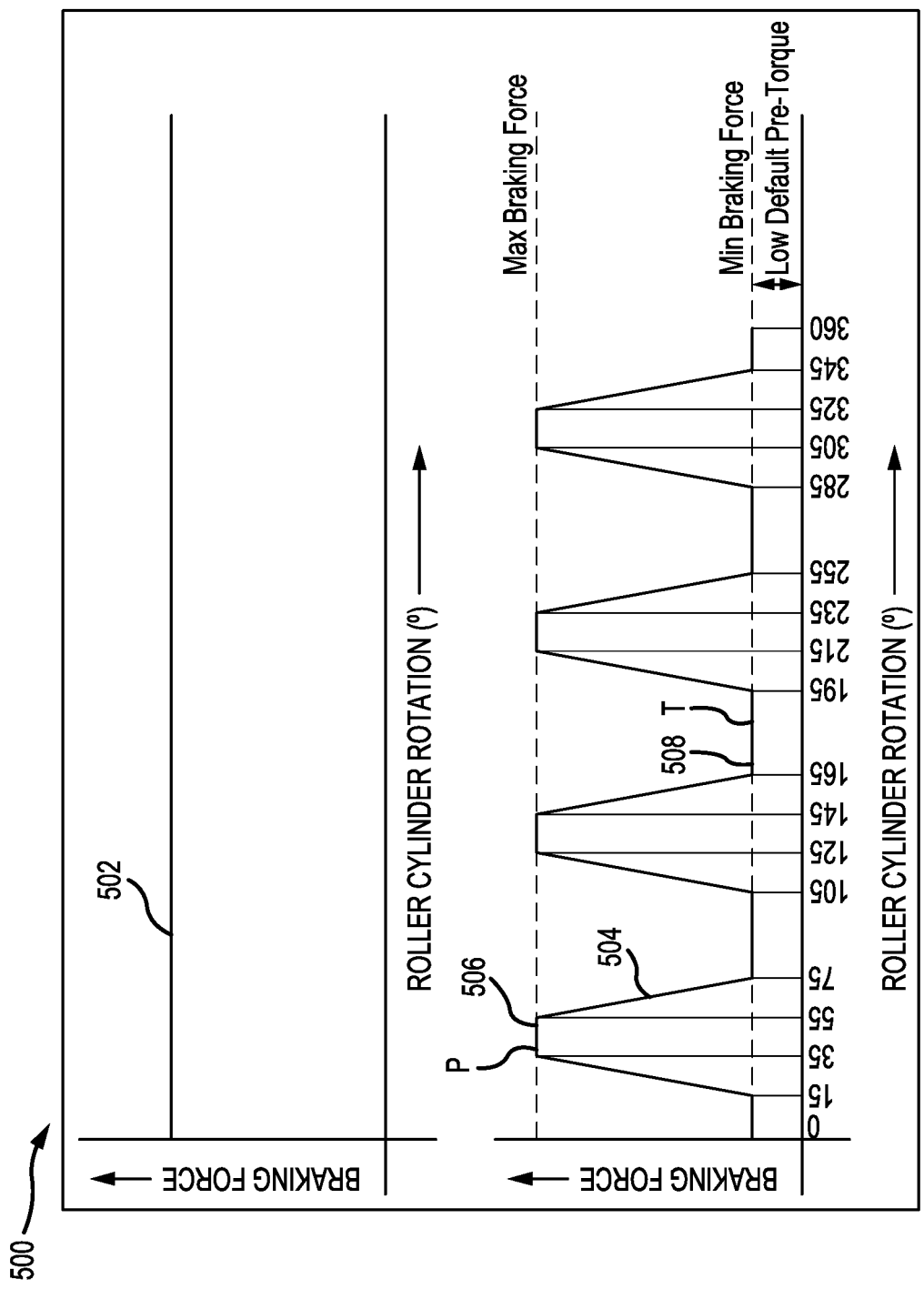
FIG. 5 provides graphs illustrating brake force versus roller cylinder rotation for an energy harvesting brake system, in accordance with various embodiments.

Referring to FIG. 5, the change between states of maximum force and minimum force against rotation of a roller cylinder, such as, for example, the roller cylinder 200 of the energy harvesting brake system 108 described above, is graphically illustrated in a graph 500 of brake force vs. degree of rotation of a roller cylinder (e.g., from 0° to 360°). Two graphs appear in FIG. 5. The top graph depicts a typical brake roller set to a apply a constant maximum brake force 502 as described in the background section above, regardless of the degree of rotation of a corresponding roller cylinder (e.g., regardless of the position of rotation about a 360° rotational cycle). Such an apparatus may lead to flattening of the tire due to non-rotation for ULDs having a weight less than the weight associate with overcoming the constant maximum brake force and to rotate the roller cylinder. The bottom graph depicts a cyclic-brake force 504 achieved through the various energy harvesting brake system embodiments disclosed herein. As illustrated, the cyclic-brake force 504 exhibits a maximum brake force 506 that will occur when each of a plurality of rollers on a guide plate are positioned proximate the peaks (P) of a flange or a slider disk, as described above. A minimum brake force 508, on the other hand, will occur when each of the plurality of rollers on the guide plate are positioned proximate the troughs (P) of the flange or the slider disk, as described above. Accordingly, and as illustrated, the cyclic-brake force 504 is developed through each rotation of the roller cylinder from 0° to 360°. As illustrated, a default pre-torque, providing the minimum brake force, may be built into the brake mechanism through an initial compression of the bias element within the brake subassembly. In addition, it should be apparent from the graph of cyclic brake force that the surface of the flange or the slider disk or both is not a pure sine wave, as both the peaks and the troughs have a substantially flat portion, leading, for example, to a constant maximum brake force between 35° and 55° and a constant minimum brake force between 125° and 145°. A variety of cyclic brake force profiles over a period of cyclic-brake force (e.g., over a period of 360° of rotation of the roller cylinder) may be achieved through variations in the faces of the flange or the slider disk or both.

In accordance with various embodiments, the piezoelectric material of energy harvesting brake system 108 is in operable communication with the shaft 210 and the roller cylinder 200 such that relative rotational motion between the shaft 210 and the roller cylinder 200 causes cyclic stress in the piezoelectric material, thereby generating electrical energy. The cyclic-braking force generated by rotation of roller cylinder 200 deforms the piezoelectric material of to generate electrical energy. Stated differently, the axial movement of slider disk 268 during rotation of roller cylinder 200 causes a deformation of the piezoelectric material of distal stator plate 248 and proximal stator plate 264. Stated yet another way, the piezoelectric material of distal stator plate 248 and proximal stator plate 264 deforms in response to changes in thickness of slider disk subassembly 206. In the state of maximum thickness 310, the deformation of the piezoelectric material of distal stator plate 248 and/or proximal stator plate 264 are maximum. In the state of minimum thickness 305, the deformation of the piezoelectric material of distal stator plate 248 and proximal stator plate 264 are minimum. In this regard, as the cyclic-brake force 504 develops through each rotation of the roller cylinder from 0° to 360°, the piezoelectric material will generate electrical energy pulse. The magnitude of electrical pulse generated is directly proportional to the mechanical deformation of the piezoelectric material of distal stator plate 248 and proximal stator plate 264

Figure 6:
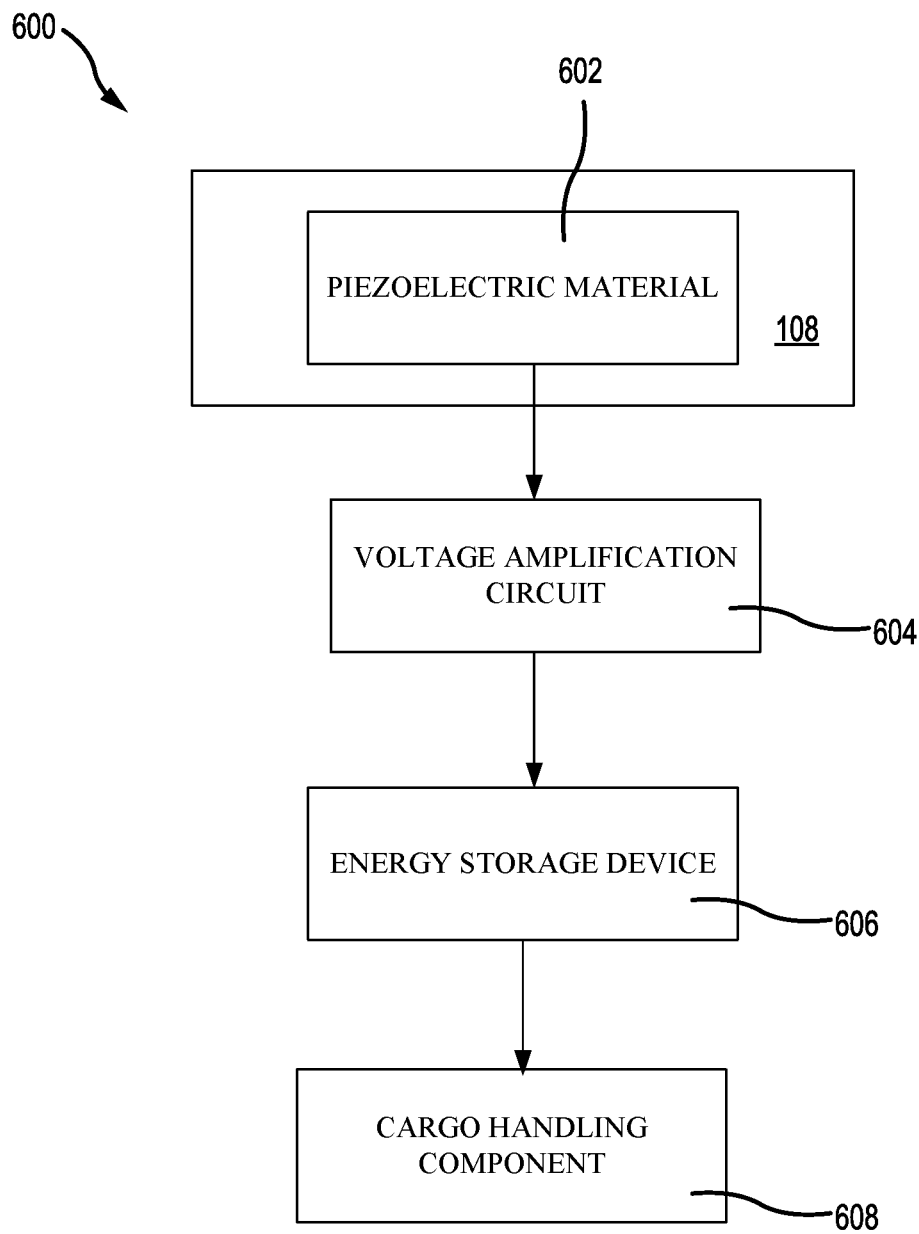
FIG. 6 illustrates an energy harvesting system including an energy harvesting brake system, in accordance with various embodiments.

In various embodiments, the deformation energy may be converted into electrical energy and stored in a storage device (e.g., a supercapacitor). For example, with reference to FIG. 6, an energy harvesting system 600 including an energy harvesting brake system 108, as described above, is illustrated. The energy generated from the deformation the piezoelectric material 602 of energy harvesting system 600 (e.g., energy generated by cyclic brake force causing deformation of distal stator plate 248 and proximal stator plate 264) may be transferred to a voltage amplification circuit 604 of energy harvesting system 600 (e.g., to Villard cascade). The voltage amplification circuit 604 may comprise of a series of resistors and capacitors. The voltage amplification circuit 604 may be configured to convert alternating current to direct current. The rectified and amplified voltage from voltage amplification circuit 604 may be stored in an energy storage device 606 of energy harvesting system 600. Energy storage device 606 may be a battery, a supercapacitor, or any other energy storage device. In accordance with various embodiments, the energy generated by the energy harvesting brake system 108 may be provided to components 608 (e.g., sensors, lights, energy storage devices, etc.) of the cargo handling system 100 in FIG. 1B and/or of the aircraft 10 in FIG. 1A. The energy harvesting brake system 108 including piezoelectric material 602 may thus provide a supplementary power source for the cargo handling system 100 and/or for the aircraft 10.

Figure 7:
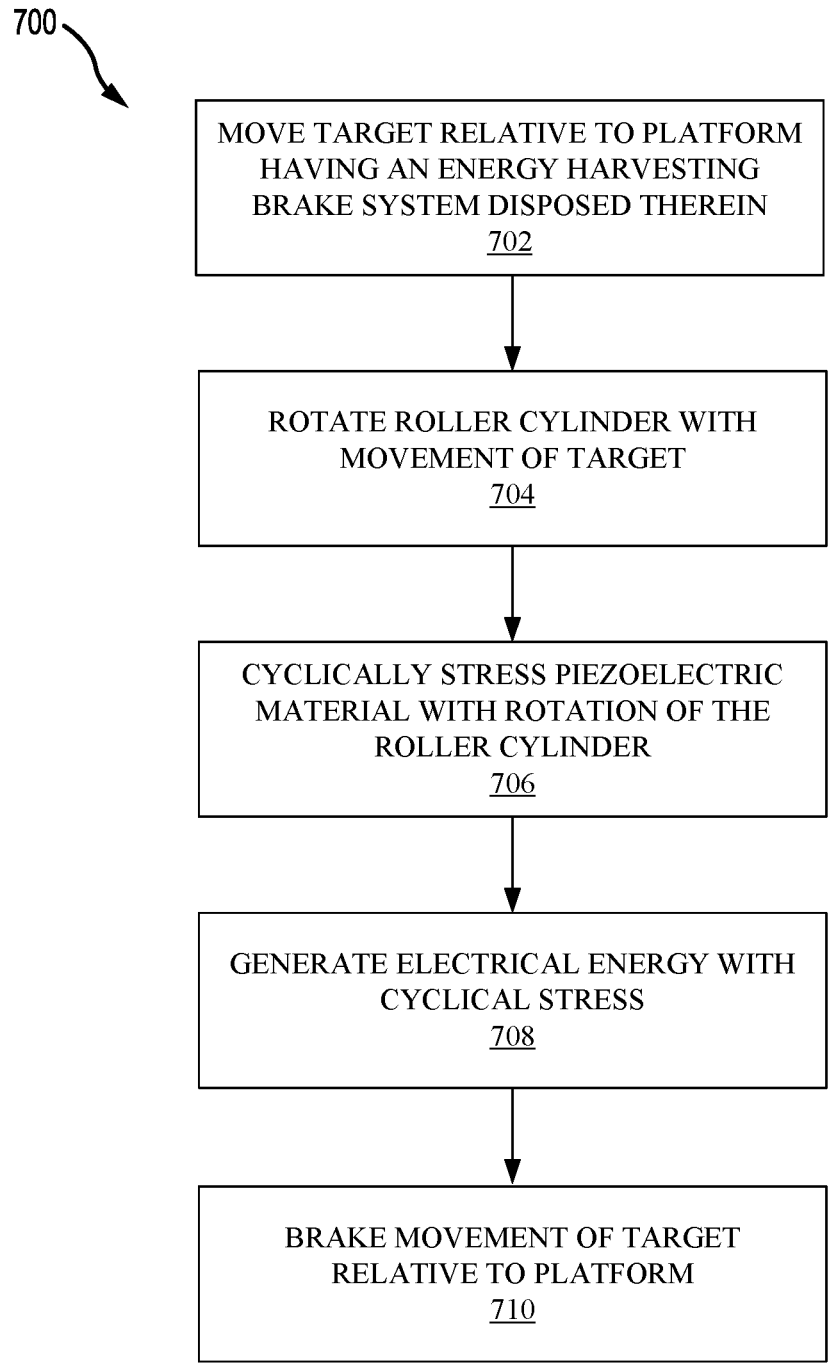
FIG. 7 illustrates a method of harvesting electrical energy while braking, in accordance with various embodiments.

With reference to FIG. 7, a method 700 of harvesting electrical energy while braking is illustrated. In accordance with various embodiments, method 700 may comprise moving a target relative to a platform having an energy harvesting brake system disposed therein (step 702) and rotating a roller cylinder of the energy harvesting brake system with the movement of the target (step 704). Method 700 may comprises cyclically stressing a piezoelectric material disposed in the energy harvesting brake system with the rotation of the roller cylinder (step 706) and generating electrical energy with the cyclical stressing (step 708).

With combined reference to FIGS. 7, 1B and 3A, step 702 may include moving target 21 relative to platform 101, platform 101 having an energy harvesting brake system 108 disposed therein. Step 704 may include rotating roller cylinder 200 of energy harvesting brake system 108 with the movement of target 21. Step 706 may include cyclically stressing piezoelectric material (e.g., distal stator plate 248 and/or proximal stator plate 264) disposed in energy harvesting brake system 108 with the rotation of the roller cylinder 200. Step 708 may include generating electrical energy with the cyclical stressing of the piezoelectric material In various embodiments, method 700 may further comprise braking (e.g., slowing or stopping) movement of the target relative to the platform (step 710). Step 710 may include braking movement of target 21 relative to the platform 101.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An energy harvesting brake system, comprising:
    a shaft;
    a roller cylinder configured to rotate relative to the shaft in response to a target moving relative to a platform, the energy harvesting brake system being disposed in the platform; and
    a piezoelectric material in operable communication with the shaft and the roller cylinder such that relative rotational motion between the shaft and the roller cylinder causes cyclic stress in the piezoelectric material thereby generating electrical energy.

2. The energy harvesting brake system of claim 1, further comprising:
    a guide plate configured to rotate about the shaft, the guide plate including a roller;
    a slider disk having a first axial facing surface defining a slider disk trough and a slider disk peak, the slider disk being configured to translate axially on the shaft in response to the roller interacting with the slider disk trough and the slider disk peak, wherein the piezoelectric material is configured to deform in response to translation of the slider disk along the shaft.

3. The energy harvesting brake system of claim 2, wherein the guide plate comprises a radially outward extending protrusion configured to engage the roller cylinder, and wherein the slider disk is rotationally stationary with respect to the shaft.

4. The energy harvesting brake system of claim 3, further comprising a brake stack located around the shaft, the brake stack including a stator plate, a rotor plate, and a roller and roller cage element located axially between the stator plate and the rotor plate.

5. The energy harvesting brake system of claim 4, wherein the stator plate comprises the piezoelectric material.

6. The energy harvesting brake system of claim 5, further comprising a flange extending radially outward from the shaft, the flange having a second axial facing surface oriented toward the first axial facing surface, the second axial facing surface defining a flange trough and a flange peak.

7. The energy harvesting brake system of claim 1, further comprising a wire electrically coupled to the piezoelectric material.

8. The energy harvesting brake system of claim 7, wherein the wire is located in a channel defined by the shaft.

9. The energy harvesting brake system of claim 1, further comprising a brake stack located around the shaft, the brake stack comprising:
   a first stator plate and a first rotor plate, the first stator plate including a first radially inward extending protrusion located in a first slot defined by the shaft, the first rotor plate including a first radially outward extending protrusion located in a second slot defined by the roller cylinder;
   a second stator plate and a second rotor plate, the second stator plate including a second radially inward extending protrusion located in the first slot defined by the shaft, the second rotor plate including a second radially outward extending protrusion located in the second slot defined by the roller cylinder;
   a first roller and roller cage element located axially between the first stator plate and the first rotor plate; and
   a second roller and roller cage element located axially between the second stator plate and the second rotor plate.

10. The energy harvesting brake system of claim 9, wherein the first stator plate comprises the piezoelectric material, and wherein the second stator plate comprises a second piezoelectric material.

11. The energy harvesting brake system of claim 10, further comprising a wire electrically coupled to the piezoelectric material and the second piezoelectric material, wherein the wire is located in a channel defined by the shaft.

12. A method of harvesting electrical energy while braking, comprising:
   moving a target relative to a platform, the platform having an energy harvesting brake system disposed therein;
   rotating a roller cylinder of the energy harvesting brake system with the movement of the target;
   cyclically stressing a piezoelectric material disposed in the energy harvesting brake system with the rotation of the roller cylinder; and
   generating electrical energy with the cyclically stressing the piezoelectric material.

13. The method of claim 12, further comprising braking movement of the target relative to the platform.

14. The method of claim 12, wherein the energy harvesting brake system, comprises:
   a shaft;
   the roller cylinder;
   the piezoelectric material;
   a guide plate configured to rotate about the shaft; and
   a slider disk configured to translate axially on the shaft in response to rotation of the guide plate about the shaft, wherein the piezoelectric material is configured to deform in response to axial translation of the slider disk.

15. An energy harvesting system, comprising:
   a first energy storage device; and
   an energy harvesting brake system electrically coupled to the first energy storage device, the energy harvesting brake system including:
      a shaft;
      a roller cylinder configured to rotate relative to the shaft; and
      a piezoelectric material in operable communication with the shaft and the roller cylinder such that relative rotational motion between the shaft and the roller cylinder causes cyclic stress in the piezoelectric material thereby generating electrical energy.

16. The energy harvesting system of claim 15, wherein the energy harvesting brake system further comprises:
   a guide plate configured to rotate about the shaft;
   a slider disk configured to translate axially on the shaft in response to rotation of the guide plate about the shaft, wherein the piezoelectric material is configured to deform in response to axial translation of the slider disk.

17. The energy harvesting system of claim 15, further comprising a voltage amplification circuit electrically coupled between the piezoelectric material and the first energy storage device.

18. The energy harvesting system of claim 17, further comprising a cargo handling component configured to receive electrical energy from the first energy storage device.

19. The energy harvesting system of claim 18, wherein the cargo handling component comprises at least one of a sensor, a light, or a second energy storage device.

20. The energy harvesting system of claim 19, wherein the energy harvesting brake system further comprises a flange extending radially outward from the shaft, the flange having an axial facing surface defining a flange trough and a flange peak.

* * * * *

UNITED STATES PATENT AND TRADEMARK OFFICE
CERTIFICATE OF CORRECTION

PATENT NO. : 11,124,364 B1
APPLICATION NO. : 16/943509
DATED : September 21, 2021
INVENTOR(S) : Venkatesh Chitragar et al.

Page 1 of 1

It is certified that error appears in the above-identified patent and that said Letters Patent is hereby corrected as shown below:

On the Title Page

Item (65), insert --Prior Publication Data US 2021/0284452 A1 Sep. 16, 2021--

Signed and Sealed this
Eighth Day of November, 2022

Katherine Kelly Vidal
*Director of the United States Patent and Trademark Office*